(12) United States Patent
Jonson

(10) Patent No.: US 7,104,224 B2
(45) Date of Patent: Sep. 12, 2006

(54) SYSTEM FOR IMPROVING THE FUEL EFFICIENCY OF AN ENGINE

(75) Inventor: Clarence Hugh Jonson, Burlington, WA (US)

(73) Assignee: PlasmaDrive, Inc., Palm Desert, CA (US)

( * ) Notice: Subject to any disclaimer, the term of this patent is extended or adjusted under 35 U.S.C. 154(b) by 149 days.

(21) Appl. No.: 10/801,188

(22) Filed: Mar. 15, 2004

(65) Prior Publication Data

US 2004/0187802 A1 Sep. 30, 2004

Related U.S. Application Data

(60) Provisional application No. 60/457,189, filed on Mar. 25, 2003.

(51) Int. Cl.
*F02B 43/08* (2006.01)
(52) U.S. Cl. ...................... 123/3; 422/186.21
(58) Field of Classification Search .............. 123/3, 123/1 A, DIG. 12; 422/186.21, 186.22
See application file for complete search history.

(56) References Cited

U.S. PATENT DOCUMENTS

| 5,379,728 | A | 1/1995 | Cooke |
|---|---|---|---|
| 5,794,601 | A | 8/1998 | Pantone |
| 6,560,958 | B1 | 5/2003 | Bromberg et al. |
| 6,606,855 | B1 | 8/2003 | Kong et al. |
| 6,715,452 | B1 * | 4/2004 | Taylor et al. ................ 123/3 |
| 6,793,898 | B1 * | 9/2004 | Brown et al. ........... 422/186.21 |

FOREIGN PATENT DOCUMENTS

| DE | 2 306362 | 8/1974 |
|---|---|---|
| WO | 02/053901 | 7/2002 |
| WO | 02/053902 | 7/2002 |
| WO | 02/055867 | 7/2002 |
| WO | 02/089536 | 11/2002 |

* cited by examiner

*Primary Examiner*—Tony M. Argenbright
*Assistant Examiner*—Katrina Harris
(74) *Attorney, Agent, or Firm*—Fish & Richardson P.C.

(57) ABSTRACT

A fuel system for improved fuel efficiency may include a fuel injector to transmit fuel in droplet form to a reaction region. A reaction rod may be positioned in the reaction region, where the reaction rod may have a convex end and a concave end. The fuel system may be used with engines such as gasoline engines, turbine engines, diesel engines, and steam engines.

33 Claims, 4 Drawing Sheets

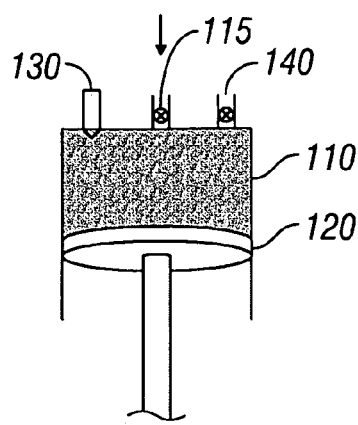
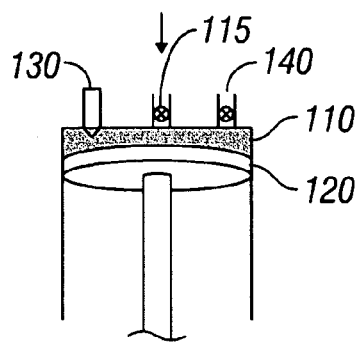
FIG. 1A
(Prior Art)
FIG. 1B
(Prior Art)
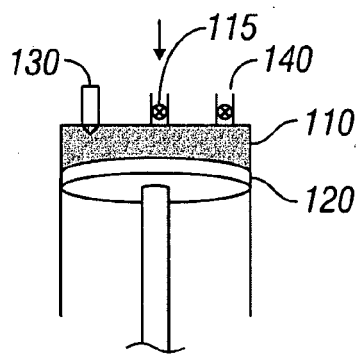
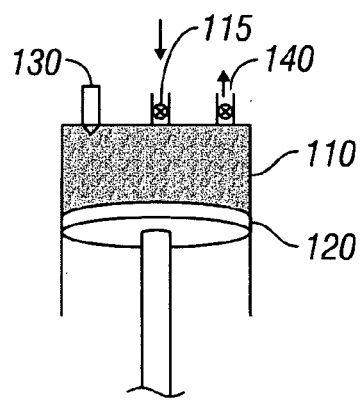
FIG. 1C
(Prior Art)
FIG. 1D
(Prior Art)
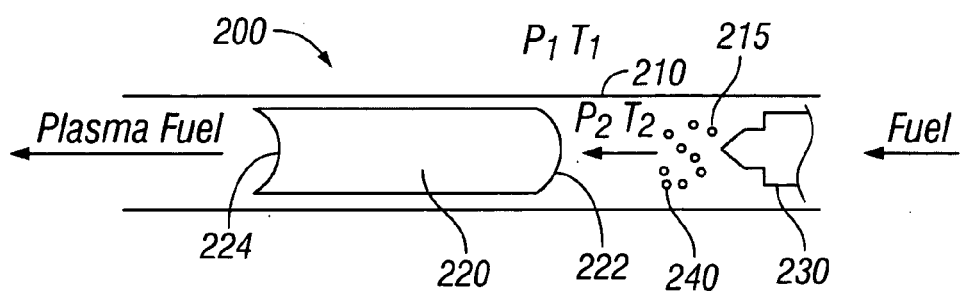
FIG. 2A

SYSTEM FOR IMPROVING THE FUEL EFFICIENCY OF AN ENGINE

CROSS-REFERENCE TO RELATED APPLICATIONS

This application claims priority to U.S. Provisional Patent Application Ser. No. 60/457,189, filed Mar. 25, 2003, entitled "SYSTEM FOR IMPROVING THE FUEL EFFICIENCY OF AN ENGINE," which is incorporated by reference in its entirety.

TECHNICAL FIELD

This invention relates to a system for improved fuel efficiency and cleaner emissions.

BACKGROUND

Engines convert energy into work. In that sense, they power the devices we use every day: automobiles, airplanes, refrigerators. But in a larger sense, engines drive the world's economy. For all the efficiencies afforded by the Internet revolution, people and things still make their way around the world under the power of engines.

Most automobile engines convert fuel into energy using an internal combustion engine powered by gasoline, propane, or diesel fuel. Because of the enormous amount of fuel converted into energy by internal combustion engines, even a small improvement in fuel efficiency provides a significant overall fuel savings.

Improved fuel efficiency can also provide substantial environmental benefits. Since less fuel is being converted into energy, a proportionately smaller amount of harmful emissions are being produced. Again, because of the sheer number of internal combustion engines in use, this can create a significant overall improvement. Further benefits may be obtained if the process of converting fuel into energy itself produces cleaner exhaust.

In a conventional internal combustion engine, gasoline and air combust to provide energy that may be used (for example) to run an automobile. FIGS. 1A to 1D show a typical cycle for an internal combustion engine. In FIG. 1A, gas and air are introduced through an inlet 115 into a cylinder 110 including a piston 120. In FIG. 1B, piston 120 is compressed. In FIG. 1C, a spark is introduced into cylinder 110 via a spark plug 130, and the air and gasoline combust. The force of combustion drives a piston downward, providing energy that may be used to drive a load (e.g., to turn a crank shaft of an automobile). In FIG. 1D, the product of the combustion is exhausted. The exhaust of a conventional internal combustion engine generally includes not only carbon dioxide and water, but also harmful substances such as carbon monoxide and nitrous oxide.

SUMMARY

In general, in one aspect a fuel system may include a fuel injector configured to receive fuel and to transmit fuel in droplet form. For example, the fuel injector may receive fuel from a fuel tank and produce droplets of fuel from the received fuel.

The fuel may be transmitted to a reaction region with a reaction rod positioned in the reaction region. In some implementations, the reaction region may be an inner region of a reaction tube. The reaction rod may have a convex end to receive fuel from the fuel injector and a concave end opposite the convex end. The reaction tube and the reaction rod may comprise a magnetically polarizable material, such as steel.

The system may include a vacuum generator in communication with the reaction region and configured to reduce the pressure of the reaction region. The vacuum generator may comprise a venturi, or a vacuum pump such as a turbopump. Other vacuum generators may be used.

The system may include an engine to be powered using fuel from the reaction region. The system may include a fuel transport tube positioned between the engine and the reaction region, where the fuel transport tube is configured to transport fuel from the reaction region to the engine. The fuel transport tube may comprise a non-magnetic material such as copper.

The system may include an exhaust pipe configured to transport exhaust from the engine to an exterior region. In some implementations, the reaction region may comprise a reaction tube, and the reaction tube may be positioned at least partially within at least a portion of the exhaust pipe.

In general, in another aspect, the system may include a first stop positioned at least partially in the reaction region proximate to a first fuel receiving end of a reaction rod and a second stop positioned at least partially in the reaction region proximate to the second end of the reaction rod. For some implementations, one of the stops may be integral to the reaction region. The first fuel receiving end of the reaction rod may be convex, while the second end of the reaction rod may be concave.

In general, in another aspect, a method of providing fuel to an engine may include generating fuel droplets from a fuel source and transmitting the fuel droplets to a reaction region proximate to a reaction rod. The reaction rod may have a first convex fuel receiving end and a second concave transmitting end. The method may further include transmitting the fuel to an engine.

The method may include generating energized fuel by transmitting fuel droplets past the reaction rod, which may include electrically transforming at least some of the droplets.

The details of one or more implementations are set forth in the accompanying drawings and the description below. Other features and advantages will be apparent from the description and drawings, and from the claims.

DESCRIPTION OF DRAWINGS

FIGS. 1A to 1D illustrate an internal combustion cycle, according to the prior art.

FIGS. 2A and 2B are schematics of plasma fuel generating systems, according to some implementations.

Like reference symbols in the various drawings indicate like elements.

DETAILED DESCRIPTION

Figure 2B:
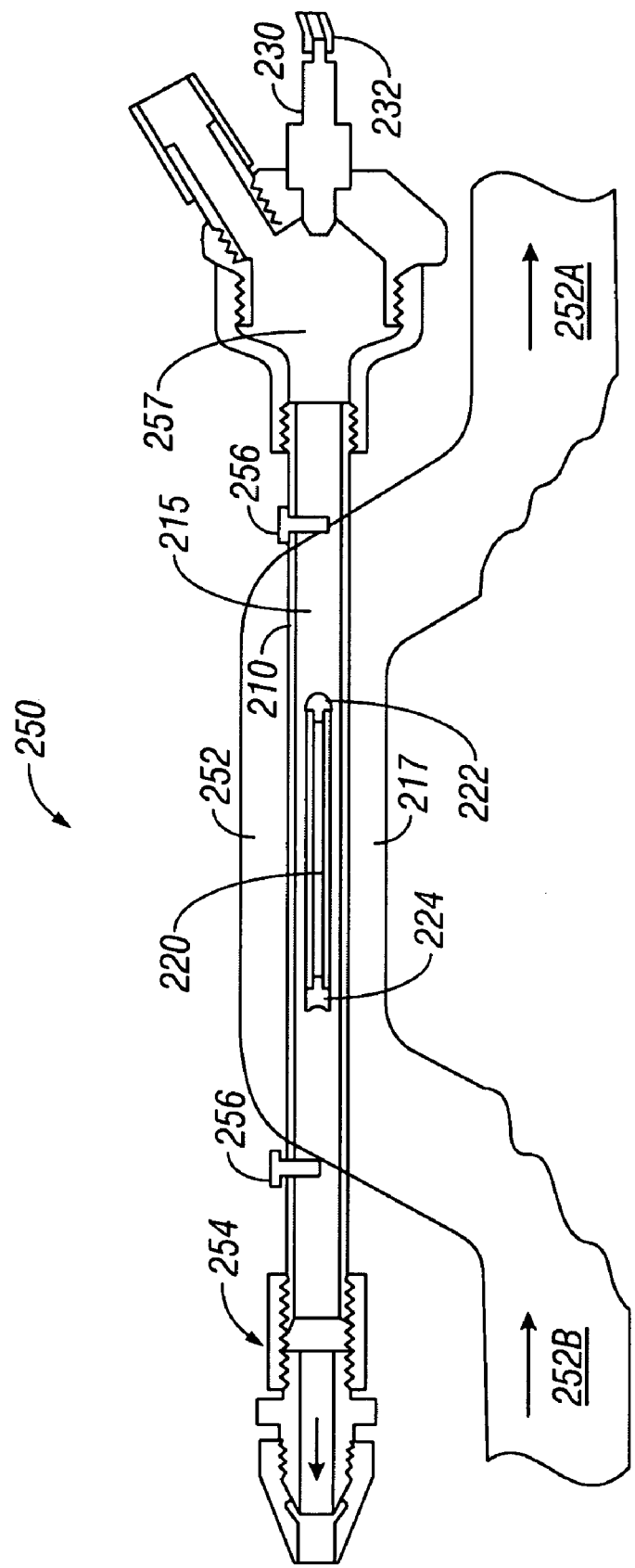

Systems and techniques described herein may both increase engine efficiency and reduce engine exhaust. In particular, the exhaust produced may contain significantly lower amounts of harmful substances than the exhaust produced using conventional fuel. More efficient and cleaner engines can provide enormous cost and environmental benefits.

Better efficiency and cleaner exhaust may be obtained using a fuel generating system such as system 200 described below. The resultant fuel appears to have characteristics of a cold plasma, and thus will be referred to as plasma fuel. However, since the chemical and/or other characteristics of the plasma fuel have not been completely characterized, the term plasma fuel as used herein is simply used as a title to refer to fuel produced as described herein. The term "non-plasma fuel" as used herein refers to fuel that is input in its unprocessed state to an injector and used to generate the plasma fuel.

FIG. 2A shows a plasma fuel generating system 200 according to some implementations, where the term "generating" refers to changing one or more characteristics of the non-plasma fuel to generate the plasma fuel. A reactor tube 210 includes a reactor rod 220. Reactor rod 220 has a convex end 222 and a concave end 224, and may be made from a single piece of metal (e.g., a solid piece of steel machined to the desired shape), or from multiple pieces. In an embodiment, rod 220 has an outer surface that fits within the inner surface of tube 210, with a total clearance of about 0.012 inches. Preferably the clearance is set so that the fluid pressure around the rod causes the rod to stay separate from the walls of tube 210. Non-plasma fuel may be introduced into an interior region 215 of reactor tube 210 using an injector 230. Non-plasma fuels that may be used with system 200 include substances such as gasoline, diesel, ethanol, and crude oil.

System 200 may operate as follows. Non-plasma fuel may be provided to an input end of injector 230. Injector 230 introduces the non-plasma fuel into interior region 215 in the form of droplets. For example, injector 230 may be an atomizer configured to generate fuel droplets from fuel in liquid form. Fuel droplets flow between the inner surface of tube 210 and the outer surface of rod 220. Plasma fuel exits tube 210 and is provided to an engine. Note that the reaction region is described as being interior to reaction tube 210. As used herein, the term "tube" refers to a material that encloses a region and not to any particular shape or type of material. For example, tubes of different sizes, cross sectional shapes and areas, different materials (e.g., stiff or flexible materials) may be used.

The current inventor has determined that a number of characteristics of system 200 may contribute to the ability of the system to produce plasma fuel for clean and efficient engine operation.

For example, interior region 215 is operated at a pressure $P_2$ less than a pressure $P_1$ exterior to tube 210. The current inventor has determined that good results may be obtained with a pressure $P_2$ of about 250 mmHg or lower. Generation of the relative vacuum in interior region 215 is discussed below with reference to FIG. 3A.

Additionally, interior region 215 is at a lower temperature $T_2$ than the temperature $T_1$ exterior to tube 210. Some cooling of interior region 215 with respect to the region exterior to tube 210 occurs due to the thermodynamics of the system operation (e.g., as a result of the formation of fuel droplets). The interior temperature thus obtained is generally sufficient for efficient system operation; however, refrigeration of the non-plasma fuel provided to injector 230 (or of other portions of system 200) may be used to further lower $T_2$.

The distance between injector 230 and convex end 222 of rod 220 may be chosen so that the number of droplets formed is large (e.g., the distance is large enough to allow a large number of droplets to form, but not so large that the non-plasma fuel vaporizes). It is believed that the form of the fuel from injector 230 is important in generating the plasma fuel. Providing non-plasma fuel in droplet form is believed to facilitate the electrical interaction in tube 210 to generate the plasma fuel.

The shape of rod 220 is an important aspect of system 200. Convex end 222 should be shaped to enable laminar flow of droplets past rod 220. Concave end 224 should be shaped so that a lower pressure region is created in the region proximate to concave end 224. It is believed that the lower pressure region may cause cavitation of the plasma fuel, accompanied by a region of relative high electrical activity proximate to concave end 224.

Some materials of system 200 may also play an important part in system efficiency. For example, rod 220 and tube 210 are generally made of a magnetically polarizable material such as steel made from natural ore. The current inventor has observed that during initial operation of a system, the engine runs roughly for an interval that is usually about fifteen minutes. It is believed that, upon initial operation of system 200, the magnetic state of rod 220 changes. Rod 220 is said to pick up a "magnetic signature" during this time. The current inventor has determined that subsequent system operation may be enhanced by performing this initial process with rod 220 oriented in a north-south direction. Note that this initialization of the magnetic state of rod 220 is believed to occur during the first operation of the system, and need not be repeated unless the system is idle for a long period of time (e.g., one to two months).

The current inventor has determined that using a non-magnetic material such as copper for tubes to transport the plasma fuel to an engine may be beneficial. It is believed that copper produces a plasma sheathing effect, so that the plasma fuel does not interact with the inner walls of the transport tubes. This effect is believed to significantly increase the duration of the state the fuel is in, so that fuel is provided to the engine in a significant state of ionization (e.g., in a plasma fuel state).

FIG. 2B shows another implementation of a plasma fuel generating system 250. Reactor rod 220 is placed in tube 210, which in turn is mounted at least partially inside an exhaust pipe 252. Note that in system 250, rod 220 is made using a hollow tube with convex end 222 and concave end 224 included in pieces attached to the appropriate end of the hollow tube. For example, the pieces may be attached by welding or other method.

Exhaust pipe 252 may be a standard vehicle exhaust pipe. For example, it may have a diameter of about 2.5 inches and be made of a material such as treated steel. Tube 210 may be welded into exhaust pipe 252 so that a central axis of the portion of tube 210 inside exhaust pipe 252 is parallel to the axis of the complementary section of exhaust pipe 252. The axes may be not only parallel, but also congruent.

Rod 220 may be placed within tube 210. Rod 220 need not be fixed within tube 210. In fact, the current inventor believes allowing rod 220 to spin within tube 210 during system operation may provide for more efficient plasma fuel generation within tube 210. The spinning may be sustained by fluid pressure of the fuel traveling through the tube. However, stops 256 may be provided as shown to prevent rod 220 from moving beyond the desired placement region and possibly damaging fittings or other components of system 250.

The length of overlap between exhaust pipe 252 and tube 210 is not believed to be critical, and may be about twice the length of rod 220. Tube 210 is generally made from a magnetically polarizable material, as noted above. In system 250, the material should also be thermally stable to withstand the heat generated by the exhaust gases flowing through exhaust pipe 252. In operation, the temperature in exhaust pipe 252 at positions away from tube 210 may be about 1000 degrees Fahrenheit, while the temperature in a region 217 of exhaust pipe 252 proximate to tube 210 may be only about 250 degrees Fahrenheit.

As noted above, rod 220 may be made from steel (e.g. soft steel), or other materials (e.g., iron pipe). The diameter of rod 220 may be from about 85% to about 97% of the inner diameter of tube 210. For example, if tube 210 has an inner diameter of 0.889 inches, reactor rod 220 may have an outer diameter of about 0.860 inches.

In system 250, the shape of convex end 224 should be sufficient to form eddies in the space proximate to end 224. The shape of convex end 222 should allow for laminar flow, and may be generally hemispherical, or may be ovoid (e.g., generally bullet-shaped or shaped like the small end of an egg). Convex end 222 should be smooth to avoid perturbing the laminar flow of non-plasma fuel past end 222.

The size of rod 220 may be chosen to provide a desired conversion level of non-plasma fuel to plasma fuel. For example, lengths from about two to about twelve inches may be used. The chosen length may be determined by the type of non-plasma fuel provided to system 250. For example, when gasoline is used, a length of about 7.25 inches may be used. For diesel fuel, a length of about 9 inches may be used. For crude oil, a length of about 12 inches may be used. Of course, the above dimensions are exemplary and others may be used.

In operation, non-plasma fuel is introduced into tube 210 using an injector 230 having an inlet 232. Non-plasma fuel is mixed with air in mixture assembly 257. As noted above, the non-plasma fuel should be in the form of liquid droplets flowing past rod 220. Injector 230 may be an atomizer or a misting nozzle. The temperature of the fuel droplets is lower than the temperature of the exhaust in exhaust pipe 252. Better results may be obtained by maximizing the temperature difference, but refrigeration of the non-plasma fuel is generally not necessary.

Fuel droplets flow past rod 220 and are converted to plasma fuel. The plasma fuel is provided to an engine (not shown) via a fuel transfer assembly 254. As noted above, the pressure in interior region 215 of tube 210 should be less than the pressure in the interior of exhaust pipe 252. Pressures of about 250 mmHg or less may be used.

Figure 3A:
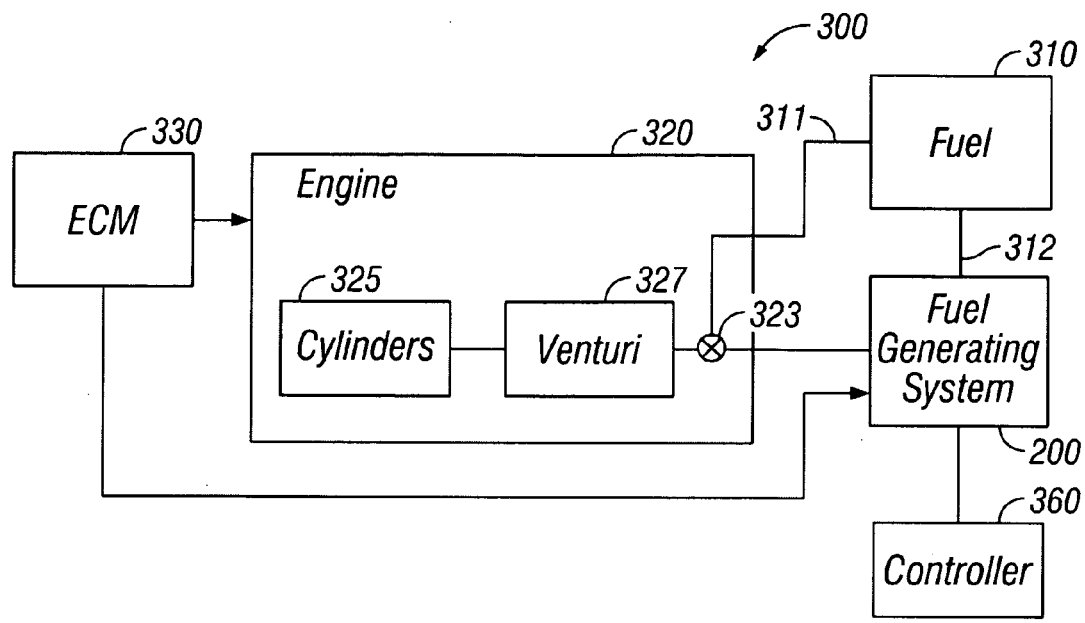
FIGS. 3A and 3B are schematics of systems including an engine incorporating a fuel generating system such as that shown in FIGS. 2A and 2B.

A plasma fuel generating system such as that illustrated in FIGS. 2A and 2B above may be used to supply plasma fuel to an engine. FIG. 3A shows a schematic of a system 300 including an engine 320 and a fuel generating system 200 for generating plasma fuel for engine 320. System 300 is a bi-fuel system; that is, it may be run using conventional fuel (e.g., gasoline) via a first output 311 of fuel tank 310 to engine 320, as well as via second output 312 to fuel generating system 200. Note that other fuel generating system implementations, such as system 250, may be used.

Fuel is contained in region 310, which may be a standard fuel tank. In operation, engine 320 is initially run using non-plasma fuel. During this time, fuel generator system 200 is energized. A flow control device such as a butterfly valve 323 controls the flow of air to cylinders 325, which combust the fuel as outlined above and shown in FIGS. 1A to 1D.

Once fuel generator 200 is sufficiently energized, engine 320 is run using plasma fuel. A controller 360 may receive a signal from a sensor in communication with fuel generator system 200 (not shown), indicating that engine 320 may be operated using plasma fuel. Butterfly valve 323 controls the flow of plasma fuel to cylinders 325. However, in other embodiments separate flow controllers may be used to control the flow of air and the flow of plasma fuel to engine 320.

As noted above, portions of fuel generating system 200 may be operated under pressures lower than atmospheric pressure (e.g., an interior region 215 of a tube 210). The pressure may be lowered using a vacuum generator. For example, a venturi 327 may be positioned between butterfly valve 323 and fuel generating system 200 to lower the pressure of portions of fuel generating system 200 as desired. Different vacuum generators may be used; for example, a vacuum pump may be used in some implementations. For a diesel engine, a turbopump is generally used to generator a vacuum.

In a conventional system, ECM 330 receives information from a number of sensors, which may include one or more oxygen sensors, a throttle position sensor (TPS), mass airflow sensor (MAF sensor) and/or other sensors. However, in implementations of the current system, controller 360 may only need input from the MAF sensor, the TPS, and the sensor indicating that system 200 has been energized. Particularly, controller 360 may not require information from oxygen sensors, unlike conventional ECMs.

Figure 3B:
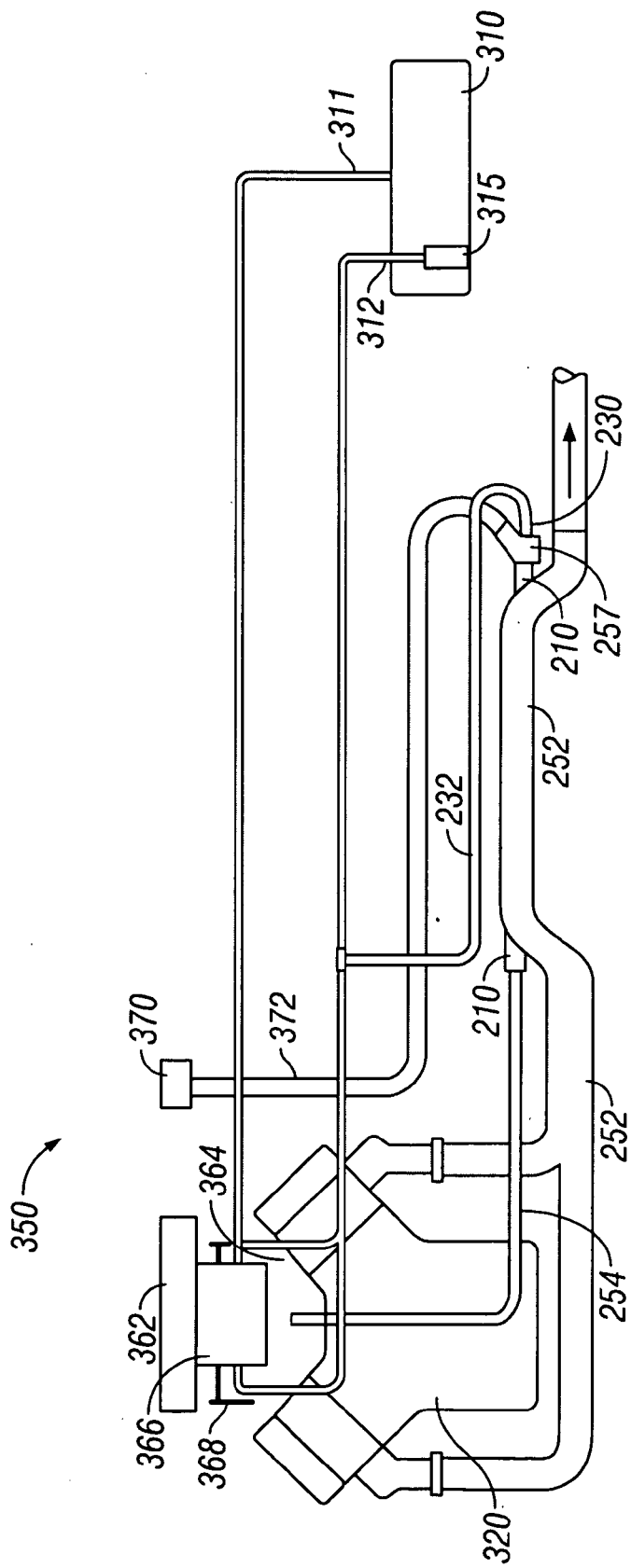

FIG. 3B shows another system 350 that may use a plasma fuel generator such as system 200 of FIG. 2A or system 250 of FIG. 2B. System 350 may be incorporated into an engine such as a carbureted V8 engine, although other engine types may be used (for example, engines incorporating fuel injection rather than carburetion may be used).

Engine 320 has a fuel tank 310 having a fuel pump 315. An air filter 362 is provided, and may be a standard air filter. Many other aspects of engine 320 (e.g., hose clamps or other fasteners) are not shown here for simplicity. Engine 320 includes an engine intake manifold 364 and a carburetor 366. A throttle arm 368 is attached to and regulates either carburetor 366 or a fuel injector.

An auxiliary air filter 370 may be used to filter the air leading into reactor tube 210. Fuel injector 230 is used to control how much non-plasma fuel is provided to tube 210. An air hose 372 (e.g., a 1.125 inch heavy duty suction hose) runs from auxiliary air filter 370 to fuel injector 230. From fuel injector 230, the fuel droplets pass through mixture assembly 256 into tube 210. Plasma fuel exits tube 210 and passes into intake manifold 364.

The plasma fuel is then used to power engine 320. Plasma fuel is mixed with air and introduced into the cylinders. The current inventor has determined that plasma fuel combusts more efficiently and more cleanly than the non-plasma fuel from which the plasma fuel is generated.

Figure 4:
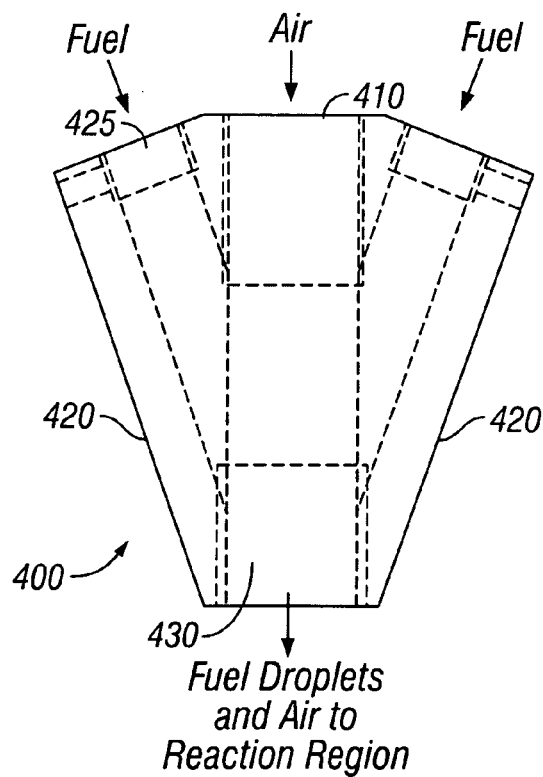
FIG. 4 shows top and side views of a fuel injector assembly that may be used in plasma fuel generating systems.

FIG. 4 shows two views of an implementation of an injector assembly 400 that may be used in a plasma fuel generating system. Note that no particular orientation of assembly 400 is required, so the two views shown are not designated; however, one view may be referred to as a top view while the other is referred to as a side view.

Assembly 400 includes a central region 410 for providing air to assembly 400. Region 410 may be in communication with an air filter (not shown), so that filtered air may be used to generate plasma fuel. Assembly 400 further includes two injector portions 420, each with a fuel input 425. Note that although two injection portions 420 are shown in FIG. 4, a single injection portions or more than two portions may be used. Air and fuel droplets combine in a region 430 of assembly 430, and are subsequently transmitted to a reaction region as described above for generation of plasma fuel from the fuel droplets.

A number of implementations have been described. Nevertheless, it will be understood that various modifications may be made without departing from the spirit and scope of the invention. For example, a plasma fuel generator may be used with different types of engines, such as diesel engines, turbine engines, steam engines, or other types of engines. Accordingly, other implementations are within the scope of the following claims.

The invention claimed is:

1. A fuel system, comprising:
   an injector configured to receive fuel and to transmit fuel in droplet form;
   a conduit having inner walls defining a reaction region, downstream of said injector, said reaction region to receive fuel from the injector; and
   a cylindrical in shape reaction rod, positioned completely in the reaction region, the reaction rod having a convex end, in the reaction region and facing to receive the fuel from the injector, the reaction rod further having a concave end at a second end opposite the convex end, and said reaction rod having a cylindrical body formed by walls that extend between said concave end and said convex end, where said fuel from said injector is directed to flow between said walls of said reaction rod and said inner walls of said conduit in a direction from the convex end to the concave end, and wherein said reaction rod reduces an inner surface area of said conduit for said fuel flow relative to an area of said conduit which does not include said reaction rod therein.

2. The system of claim 1, wherein the reaction region comprises an inner region of a reaction tube.

3. The system of claim 2, wherein the reaction tube comprises a magnetically polarizable material.

4. The system of claim 1, wherein the reaction rod comprises a magnetically polarizable material.

5. The system of claim 4, wherein the material comprises steel.

6. The system of claim 1, further comprising a vacuum generator in communication with the reaction region, the vacuum generator configured to reduce a pressure of the reaction region with respect to a region exterior to the reaction region.

7. The system of claim 6, wherein the vacuum generator comprises a venturi.

8. The system of claim 6, wherein the vacuum generator comprises a turbopump.

9. The system if claim 1, further including an engine configured to be powered using fuel from the reaction region.

10. The system of claim 9, further including a fuel transport tube positioned between the engine and the reaction region, the fuel transport tube configured to transport fuel from the reaction region to the engine.

11. The system of claim 10, wherein the fuel transport tube comprises a non-magnetic material.

12. The system of claim 11, wherein the non-magnetic material comprises copper.

13. The system of claim 9, further including an exhaust pipe configured to transport exhaust from the engine to an exterior region.

14. The system of claim 13, wherein the reaction region comprises a reaction on tube, the reaction tube positioned at least partially within at least a portion of the exhaust pipe.

15. An engine system, comprising:
    a fuel storage region;
    an injector configured to receive fuel from the fuel storage region and to transmit fuel in droplet form;
    a conduit having inner wall defining a reaction region, downstream of said injector, salt reaction region to receive fuel from the injector; and
    a cylindrical in shape reaction rod, positioned completely in the reaction region, the reaction rod having a convex end, in the reaction region and facing to receive the fuel from the injector, the reaction rod further having a concave end at a second end opposite the convex and said reaction rod having a cylindrical body formed by walls that extend between said concave end and said convex end, where said fuel from said injector is directed to flow between said walls of said reaction rod and said inner walls of said conduit in a direction from the convex end to the concave end, and wherein said reaction rod reduces an inner surface area of said conduit for said fuel flow relative to an area of said conduit which does not include said reaction rod therein.

16. The system of claim 15, further including an engine in communication with tile reaction region.

17. The system of claim 16, wherein the engine includes one or more cylinders.

18. The system of claim 16, wherein the engine comprises an engine selected from the group consisting of a turbine engine, a diesel engine, a steam engine, and a gas engine.

19. The system of claim 17, further comprising a vacuum generator in communication with the reaction region.

20. The system claim 19, wherein the vacuum generator is selected from the group consisting of a venturi and a vacuum pump.

21. The system of claim 17, wherein the engine system is included in a vehicle.

22. A fuel system, comprising:
    an injector configured to receive fuel and to transmit fuel in droplet form;
    a conduit having inner walls defining a reaction region, downstream of said injector, said reaction region to receive fuel from the injector, and said region defining an axis along said reaction region;
    a cylindrical in shape rod, positioned completely in the reaction region and movable along said axis within the reaction region, the reaction rod having a first fuel receiving end, in the reaction region and to receive the fuel from the injector, the reaction rod further having a second end opposite the first fuel receiving end, said second end receiving fuel that has passed said first end;
    a first stop positioned at least partially in the reaction region proximate to the first fuel receiving end of the reaction rod and in a location that allows said reaction rod to move along said axis, but preventing said reaction rod from moving along said axis beyond a position of said first stop; and
    a second stop positioned at least partially in the reaction region proximate to the second end of the reaction rod and in a location that allows said reaction rod to move along said axis, but preventing said reaction moving along said axis beyond a position of said second stop.

23. The system of claim 22, wherein the first fuel receiving end of the reaction rod has a convex shape.

24. The system of claim 23, wherein said reaction rod has a cylindrical block formed by walls that extend between said first fuel receiving end and said second end, where said fuel from said injector is directed to flow between said walls of said reaction rod and said inner walls of said conduit, and wherein said reaction rod reduces an inner surface area of said conduit for said fuel flow relative to an area of said conduit which does not include sad reaction rod therein.

25. A method of providing fuel to an engine, comprising:
generating fuel droplets from a fuel source;
transmitting the fuel droplets to a reaction region within a conduit, proximate to a reacting rod;
transmitting the fuel droplets to the reaction region, and past a the reaction rod, where a first convex fuel receiving end of the reaction rod first receive said fuel, and after passing said first end, the fuel travels to a second concave fuel transmitting end; and
transmitting the fuel which has passed said first and second ends of said reaction rod, to the engine.

26. The method of claim 25, wherein said reaction rod reduces a cross sectional area of a fuel transmitting conduit, in an area here said reaction rod is located.

27. The method if claim 25, further comprising reducing the pressure in the reaction region.

28. The method of claim 25, wherein the reaction rod comprises a magnetically polarizable material.

29. The method claim 25, wherein the reaction region is enclosed by a reaction tube.

30. The method of claim 29, wherein the reaction tube comprises a magnetically polarizable material.

31. The system of claim 1, wherein the injector comprises a fuel injector.

32. The system of claim 1, wherein the injector comprises an atomizer.

33. The system of claim 1, wherein the injector comprises a misting nozzle.

* * * * *